(12) United States Patent
Takemoto et al.

(10) Patent No.: US 6,800,348 B2
(45) Date of Patent: *Oct. 5, 2004

(54) OPTICAL RECORDING MEDIUM

(75) Inventors: Hiroyuki Takemoto, Miyagi (JP); Atsushi Takeuchi, Miyagi (JP); Yoshihito Fukushima, Miyagi (JP); Kenichi Itoh, Kanagawa (JP); Mineo Moribe, Kanagawa (JP); Takehiko Numata, Kanagawa (JP)

(73) Assignees: Sony Corporation, Tokyo (JP); Fujitsu, Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,206

(22) PCT Filed: Jun. 4, 1999

(86) PCT No.: PCT/JP99/03006

§ 371 (c)(1),
(2), (4) Date: May 12, 2000

(87) PCT Pub. No.: WO99/63534

PCT Pub. Date: Dec. 9, 1999

(65) Prior Publication Data

US 2002/0127365 A1 Sep. 12, 2002

(30) Foreign Application Priority Data

Jun. 4, 1998 (JP) .......................................... P10-156277

(51) Int. Cl.$^7$ ............... B32B 3/02; G11B 7/24
(52) U.S. Cl. ................. 428/64.4; 428/64.1; 369/275.1; 369/275.3; 369/275.4
(58) Field of Search ................ 428/64.4, 64.1; 369/275.1, 275.3, 275.4

(56) References Cited

U.S. PATENT DOCUMENTS

| | | | | |
|---|---|---|---|---|
| 5,406,546 A | * | 4/1995 | Uchiyama et al. | 369/275.4 |
| 5,581,539 A | * | 12/1996 | Horie et al. | 369/275.4 |
| 5,615,180 A | | 3/1997 | Mieda et al. | |
| 5,681,633 A | | 10/1997 | Onagi et al. | |
| 5,737,307 A | | 4/1998 | Shimizu | |
| 5,822,294 A | | 10/1998 | Ohtomo et al. | |
| 5,978,327 A | | 11/1999 | Kuroda et al. | |
| 6,069,869 A | * | 5/2000 | Nagasawa et al. | 369/275.3 |
| 6,163,522 A | * | 12/2000 | Nakane et al. | 369/275.3 |

FOREIGN PATENT DOCUMENTS

| | | |
|---|---|---|
| EP | 0759609 | 2/1997 |
| GB | 2311644 | 10/1997 |
| JP | 62-78729 | 4/1987 |
| JP | 4-78034 | 3/1992 |
| JP | 6-282849 | 10/1994 |
| JP | 6-302031 | 10/1994 |
| JP | 7-14230 | 1/1995 |
| JP | 7-85516 | 3/1995 |
| JP | 9-259439 | 10/1997 |
| JP | 11-126343 | 5/1999 |

* cited by examiner

Primary Examiner—Cynthia H. Kelly
Assistant Examiner—L. Ferguson
(74) Attorney, Agent, or Firm—Sonnenschein, Nath & Rosenthal LLP

(57) ABSTRACT

A magneto-optical disk having recording tracks are formed along concentric grooves or a spiral groove. A non-groove region where no grooves are made is provided in a middle part of each recording track. In the non-groove region, there is formed a pit pattern representing information about the recording track. A track-counting U-groove is formed in the non-groove region, for detecting that the light spot of a reading laser beam has moved across the recording track. With the disk thus structured, it is possible to record information at high density and to access a desired recording track at high speed.

17 Claims, 13 Drawing Sheets

OPTICAL RECORDING MEDIUM

TECHNICAL FIELD

The present invention relates to an optical recording medium on which information about recording tracks is recorded in the form of a bit pattern, an optical recording medium substrate for use in the optical recording medium, a method of manufacturing a master disk for use in manufacturing the optical recording medium, and a method of accessing tracks provided on the optical recording medium.

BACKGROUND OF THE INVENTION

In recent years, disk recording/reproducing systems, each being small and having a large storage capacity and a high access speed, have come into use in increasing numbers. In these systems that optically record and reproduce data, magneto-optical disk system is reliable and can repeatedly record data on the recording medium and erase data therefrom. The magneto-optical disk system is therefore widely used.

Used as a recording medium in the magneto-optical disk system is a magneto-optical disk. The magneto-optical disk in common use has either concentric grooves or a spiral groove in the signal recording surface, for guiding the recording/reproducing laser beam along the recording tracks. The recording tracks are formed along the either concentric grooves or the spiral groove.

A magneto-optical disk of this type has been proposed, in which the recording tracks are divided into sectors having an appropriate length so that the tracks may be easily recorded and accessed. Management information, such as physical addresses, is recorded in the sectors so that data may be processed in units of sectors. In the magneto-optical disk of this type, the recording area is divided into several zones in most cases, for which different basic clock signals are allocated, and each track is divided into tens to hundreds of sectors.

In this magneto-optical disk, the management information for each sector is written, in the form of emboss pits, in a region called "land" provided between the adjacent grooves, so that the disk may be easily produced in great quantities.

In recent years, it has been proposed that the track pitch be decreased to enhance the recording density on the surface of the magneto-optical disk. This is because the amount of information processed in the magneto-optical disk system has increased.

If, however, the track pitch is decreased on the magneto-optical disk of the type mentioned above, however, it will be difficult to form pits for the management information between the adjacent grooves. In the process of manufacturing the master disk of the magneto-optical disk of this type, two laser beams spaced apart by half the track pitch are applied to the resist film formed on a glass substrate. A latent image for the pits and another latent image for the grooves are thereby formed on the resist film. If the tack pitch is decreased, the two laser beam will interfere with each other, inevitably irradiating the region between each pit and an adjacent groove. Consequently, desirable latent images may not be formed in some cases. Magneto-optical disks made by the use of such a master disk have but a low reproducing modulation factor of pits, and appropriate signals cannot be reproduced from these magneto-optical disks.

In order to eliminate this drawback, a system has been proposed in which no grooves are made in any region where pits for the management information are to be formed. (Hereinafter, the system will be referred to as "discontinuous groove type.")

With a magneto-optical disk of the discontinuous groove type, however, it is difficult to access the desired track at high speed. That is, on the magneto-optical disk of the discontinuous groove type, the region where the pits representing the management information are formed has a so-called mirror part that has neither pits nor grooves. When the light spot of the reading laser beam moves across a track over the mirror part in the seek operation to access the desired track, no signal is generated to indicate that the light spot has crossed over a track. As a consequence, the number of tracks the light spot has crossed may not be correctly counted in some cases.

SUMMARY OF THE INVENTION

The present invention has been made in consideration of the existing technology described above. The object of the invention is to provide an optical recording medium which can record data at high density and on which a target track can be accessed at high speed, an optical recording medium substrate for use in this optical recording medium, a method of manufacturing a master disk for use in manufacturing the optical recording medium, and a method of accessing tracks provided on the optical recording medium.

An optical recording medium according to the invention has recording tracks formed along either concentric grooves or a spiral groove. Information is recorded on the lands provided between the grooves. The recording area has regions where no grooves are made. Each non-groove region has a part that corresponds to a land. In this part of each region, a pit pattern representing information about the recording track is formed. The optical recording medium is characterized in that a detection pattern is provided on each region where no groove are made, in order to optically detect that the light spot of a reading laser beam has moved across the recording track.

In the course of accessing a track provided on this optical recording medium, the reading laser beam is applied to the detection pattern, generating a signal, as the light spot of the reading laser beam moves across the region where no grooves are made. The signal is used to count tracks, making it possible to access the track at a desired high speed.

With the optical recording medium it is desired that each detection pattern be provided in the form of a U-groove along the recording track, integrated with the pit pattern. If the detection pattern is a U-groove, provided integral with the pit pattern, it will be formed with ease.

An optical recording medium substrate according to the invention is designed for use in an optical recording medium which has recording tracks formed along either concentric grooves or a spiral groove. Information is recorded on the lands provided between the grooves. The recording area has regions where no grooves are made. Each non-groove region has a part that corresponds to a land. In this part of each region, a pit pattern representing information about the recording track is formed. The optical recording medium substrate is characterized in that a detection pattern is provided at a part corresponding to each region where no grooves are made, in order to optically detect that the light spot of a reading laser beam has moved across the recording track.

In the course of accessing a track provided on a optical recording medium using the optical recording medium substrate, the reading laser beam is applied to the detection pattern, generating a signal, as the light spot of the reading laser beam moves across the region where no grooves are made. The signal is used to count tracks, making it possible to access the track at a high speed which is desired.

With the optical recording medium substrate it is desired that each detection pattern be provided in the form of a U-groove along the recording track, integrated with the pits that form the pit pattern. If the detection pattern is a U-groove, provided integral with the pits forming the pit pattern, it will be formed with ease.

According to the invention there is provided a method of manufacturing a master disk for use in manufacturing an optical recording medium that has recording tracks formed along either concentric grooves or a spiral groove. Information is recorded on the lands provided between the grooves. The recording area of the medium has regions where no grooves are made. Each non-groove region has a part corresponding to a land. In this part of each region, a pit pattern representing information about the recording track is formed. A detection pattern is provided on that part, integrated with the pit pattern, in order to optically detecting that the light spot of a reading laser beam has moved across the recording track. The method is characterized in that a laser beam is applied at a specific intensity to that part of a photosensitive layer which corresponds to the pit pattern and at a different intensity to the other part of the photosensitive layer, in the process of applying the laser beam to the photosensitive layer to form a latent image corresponding to the detection pattern. The latent image corresponding to the detection pattern is thereby formed to a certain depth in the part corresponding to the pit pattern and to a different depth in the other part of the photosensitive layer.

With the method of manufacturing a master disk, it is possible to easily form an latent image corresponding to a detection pattern, to a particular depth in a part corresponding to a pit pattern and to a different depth in the other part of the photosensitive layer.

According to the invention there is provided a method of manufacturing a master disk for use in manufacturing an optical recording medium that has recording tracks formed along either concentric grooves or a spiral groove. Information is recorded on the lands provided between the grooves. The recording area of the medium has regions where no grooves are made. Each non-groove region has a part corresponding to a land. In this part of each region, a pit pattern representing information about the recording track is formed. A detection pattern is provided on that part, integrated with the pit pattern, in order to optically detect that the light spot of a reading laser beam has moved across the recording track. The method is characterized in that a laser beam is applied with a specific diameter to that part of a photosensitive layer which corresponds to the pit pattern and with a different diameter to the other part of the photosensitive layer, in the process of applying the laser beam to the photosensitive layer to form a latent image corresponding to the detection pattern. The latent image corresponding to the detection pattern is thereby formed to have a certain width in the part corresponding to the pit pattern and a different width in the other part of the photosensitive layer.

With this method of manufacturing a master disk, it is possible to easily form an latent image corresponding to a detection pattern, which has a particular width in a part corresponding to a pit pattern and a different width in the other part of the photosensitive layer.

According to the present invention there is provided a method of accessing tracks provided on the optical recording medium that has recording tracks formed along either concentric grooves or a spiral groove. Information is recorded on the lands provided between the grooves. The recording area of the medium has regions where no grooves are made. Each non-groove region has a part corresponding to a land. In this part of each region, a pit pattern representing information about the recording track is formed. A detection pattern is provided on that part, integrated with the pit pattern, in order to optically detect that the light spot of a reading laser beam has moved across the recording track. The method is characterized in that, in the process of performing a seek operation on the optical recording medium to access a desired recording track, tracks are counted for the regions where no grooves are made, on the basis of the information optically obtained from the detection pattern, and for the regions where grooves are made, on the basis of the information optically obtained from the grooves.

With the method of accessing tracks, it is possible to appropriately access any track on an optical recording medium that has a recording area including regions where no grooves are made.

DESCRIPTION OF THE PREFERRED EMBODIMENTS

Figure 1:
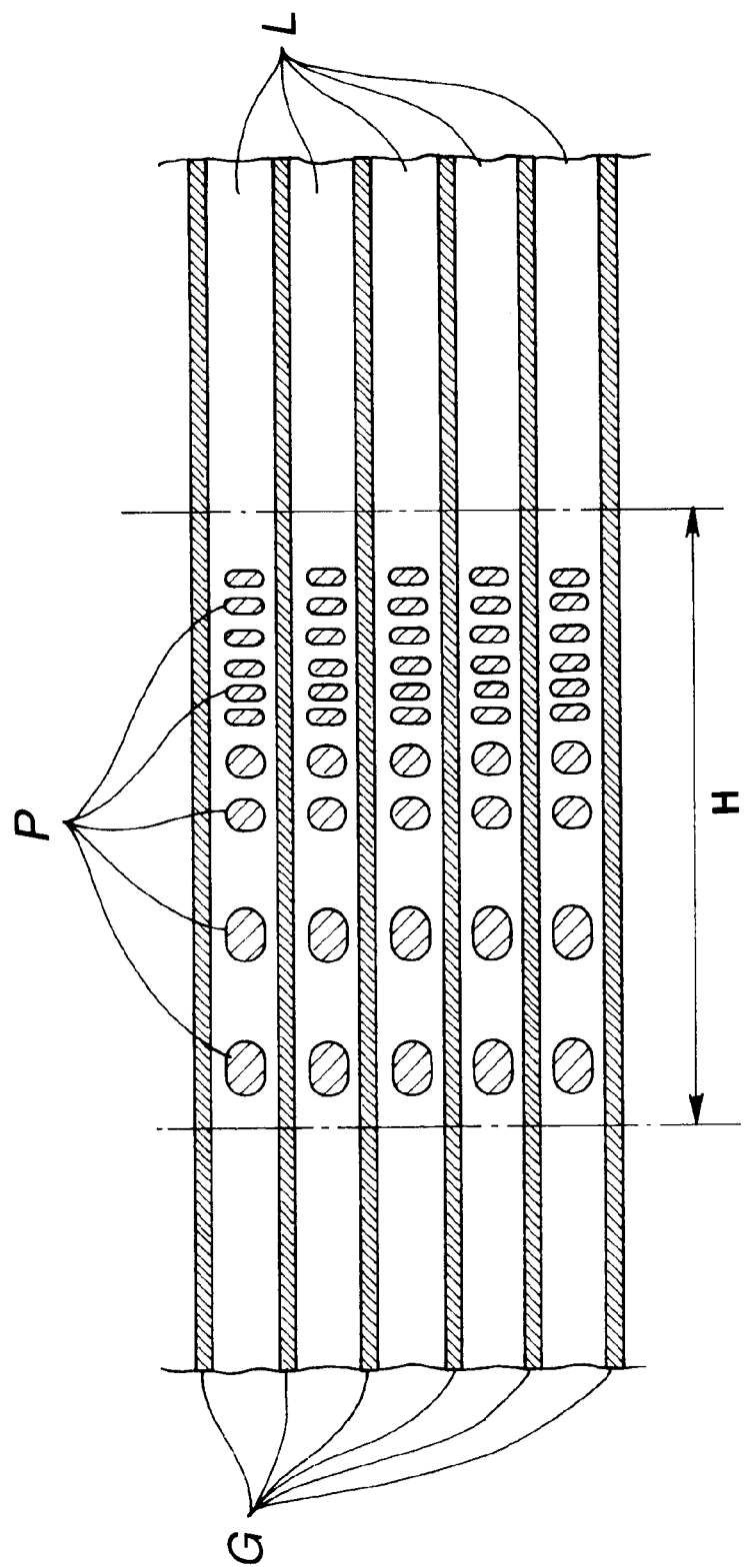
FIG. 1 is a magnified view of a part of the recording area of a magneto-optical disk of the ISO standard format.

The best mode for carrying out the present invention will be described below, with reference to the accompanying drawings.

Hereinafter there will be described a magneto-optical disk comprising a disk substrate, a magneto-optical recording layer provided on the disk substrate, and a protection layer provided on the magneto-optical recording layer.

The magneto-optical disk according to the invention has a recording area and either concentric grooves or a spiral groove. The grooves or groove is provided in the recording area. Recording tracks are formed along concentric grooves or a spiral groove. The magneto-optical disk is designed to record information in the lands provided between the grooves.

On the magneto-optical disk, the recording tracks are divided into sectors of appropriate lengths. Management information, such as a physical address, is recorded in each of the sectors so that data may be processed in units of sectors.

The magneto-optical disk is a magneto-optical disk called "discontinuous groove type." The recording area includes regions (header regions) where no grooves are made. In each region where no grooves are made, there is formed a pit pattern that represents the management information described above.

This magneto-optical disk is characterized in that a detection pattern is formed, along with the pit pattern, in each region where no grooves are formed.

The detection pattern is used to detect that the light spot of a reading laser beam has moved across the recording track. The pit pattern and the detection pattern are formed in a region where no grooves are made, at a distance of about ½ track pitch from an extension of the groove, as measured in the direction at right angles to the recording track. In other words, they are formed along the extension of the groove, at almost the midpoint between two adjacent grooves, which corresponds to the land.

With the magneto-optical disk according to the invention, the tracks are counted on the basis of the signals generated by applying the reading laser beam to the grooves, in the case where the light spot of the reading laser beam moves across the regions where grooves are made in the course of a seek operation for accessing the desired track. In the case where the light spot of the reading laser beam moves across the regions where no grooves are made, the tracks are counted on the basis of the signals generated by applying the reading laser beam to the detection patterns. In either case, the desired track can be reliably accessed.

In the magneto-optical disk according to this invention, each detection pattern is formed integral with a pit pattern, in the form of, for example, a U-groove that extends in the same direction as the grooves which are also U-grooves.

Hereinafter, an example of the disk, in which each detection pattern is formed integral with one pit pattern in the form of a U-groove, will be described in comparison with a magneto-optical disk of the ISO standard format. In the following description, the detection pattern formed integral with the pit pattern in the form of a U-groove will be called "track-counting U-groove." That part of the track-counting U-groove, which corresponds to the pit pattern, will be called "M part," and the other part of the track-counting U-groove will be called "S part."

As shown in FIG. 1, the magneto-optical disk of the ISO standard format has grooves G, each being continuous and made in the boundaries between the recording tracks. A pit pattern P representing management information is formed in a region (i.e., header region H) of the land L provided between two adjacent grooves G.

On the magneto-optical disk of the ISO standard format, shown in FIG. 1, the reading laser beam is applied to the grooves, thereby generating signals. Tracks are counted on the basis of the signals. More specifically, the tracks are counted during the seek operation, on the basis of tracking error signals each indicating that the light spot of the reading laser beam is deviated from a track.

By contrast, the magneto-optical disk according to the present embodiment is one of the so-called discontinuous groove type disks. Each track has a region where no grooves are made. Hence, the track cannot be counted on the basis of the signal generated when the reading laser beam is applied to the non-groove region of the track.

Therefore, a track-counting U-groove in that part of the non-groove region which corresponds to the land. A signal is generated when the light spot of the reading laser beam moves across the non-groove region, illuminating the track-counting U-groove. The track is counted on the basis of this signal.

On this magneto-optical disk, the track is counted on the basis of the signal generated by applying the laser beam to the groove when the light spot of the reading laser beam crosses any region where a groove is made, in the same way as in the magneto-optical disk of the ISO standard format. To accomplish correct track counting on the magneto-optical disk according to the present embodiment, it is required that the signal generated by applying the reading laser beam to the groove should have the same polarity as the signal generated by applying the reading laser beam to the track-counting U-groove formed at a distance of about ½ track pitch from an extension of the groove.

As is known, a tracking error signal generally has a maximum amplitude when the depth of the groove is ⅛λ', ⅜λ', (λ'=λ/n), where λ is the wavelength of the reading laser beam and n is the refractive index of the disk substrate. The polarity of the tracking error signal is inverted at the amplitude of ¼λ', ¾λ', ... Thus, the polarity of the tracking error signal can be altered by adjusting the depth of the groove that is irradiated with the reading laser beam.

This principle is utilized with the magneto-optical disk according to this embodiment. That is, the depth of the groove and the depth of the track-counting U-groove are set at appropriate values, thereby imparting the same polarity to the signal generated by applying the reading laser beam to the groove and the track-counting U-groove. As a result, the tracks can be counted reliably.

In this magneto-optical disk, each detection pattern for achieving the track counting is provided integral with one pit pattern representing the management information, in the form of a track-counting U-groove. Therefore, the M part and S part of the track-counting U-groove must have different shapes in order to impart a reproducing modulation factor to the pit pattern.

(Embodiment Wherein M and S Parts Have Different Depths)

Figure 2:
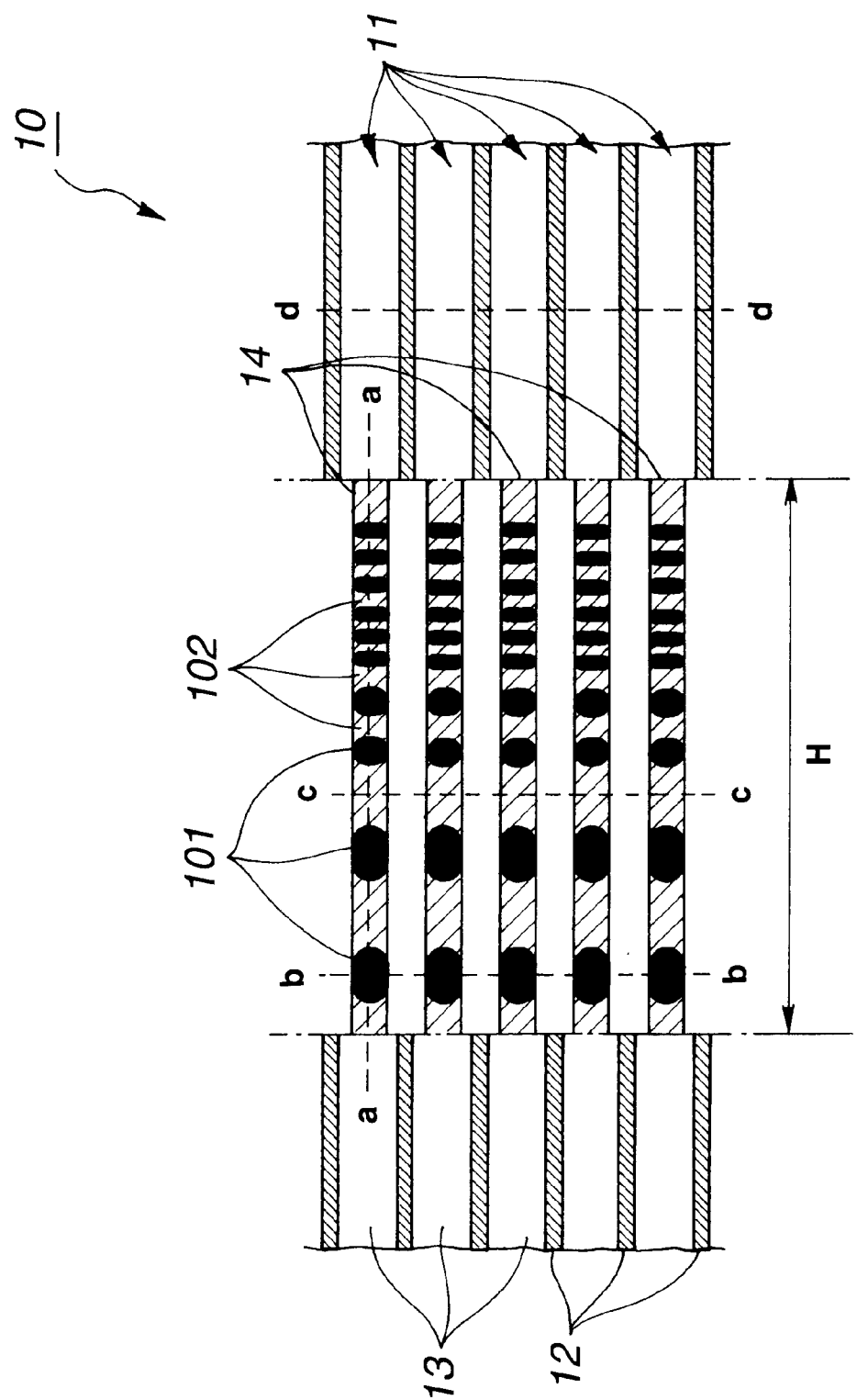
FIG. 2 is a magnified view of a part of the recording area of a magneto-optical disk according to this invention.
Figure 3:
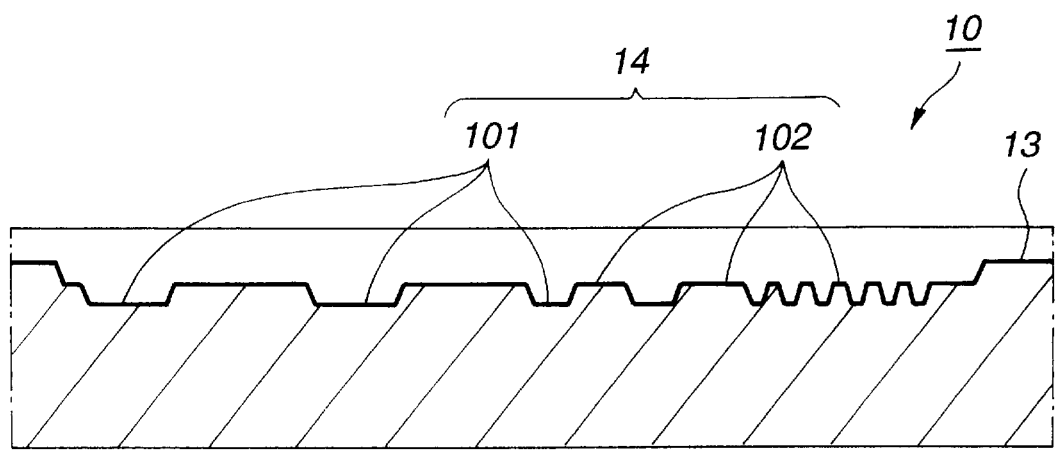
FIG. 3 is a sectional view taken along line III—III in FIG. 2.
Figure 4:
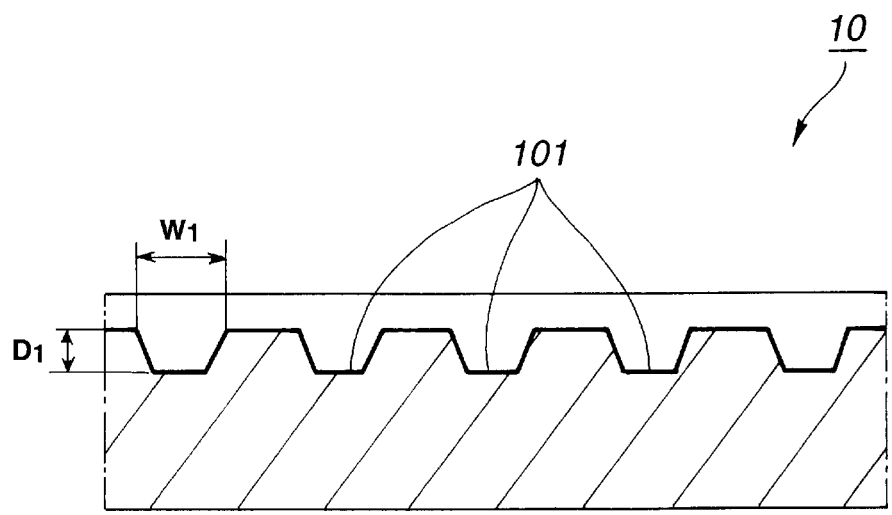
FIG. 4 is a sectional view taken along line IV—IV in FIG. 2.
Figure 5:
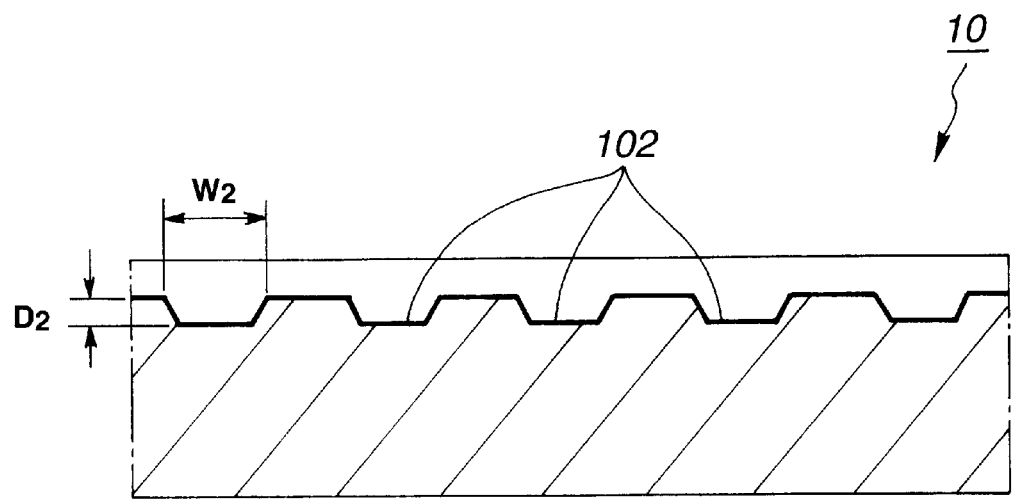
FIG. 5 is a sectional view taken along line V—V in FIG. 2.
Figure 6:
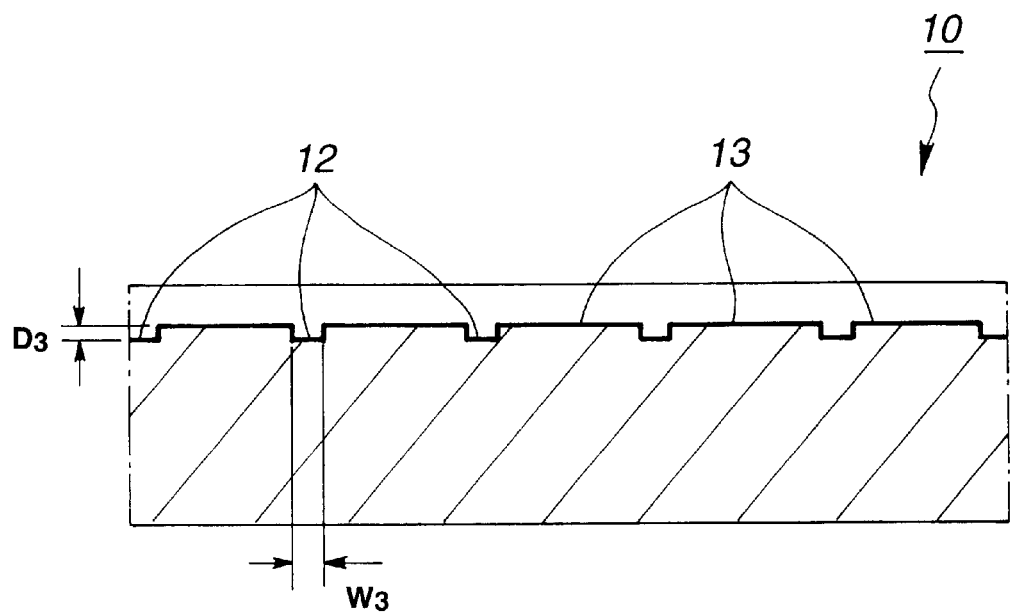
FIG. 6 is a sectional view taken along line VI—VI in FIG. 2.

FIGS. 2 to 6 shows a magneto-optical disk according to the present invention. In this embodiment, the M part 101 and the S part 102 differ in depth, imparting to the pit pattern a reproducing modulation factor that can be read. FIG. 2 is a magnified view of a part of the recording area of a magneto-optical disk 10 according to this embodiment. FIG. 3 is a sectional view taken along line III—III in FIG. 2; FIG. 4 is a sectional view taken along line IV—IV in FIG. 2; FIG. 5 is a sectional view taken along line V—V in FIG. 2; and FIG. 6 is a sectional view taken along line VI—VI in FIG. 2.

The magneto-optical disk 10 shown in FIGS. 2 to 6 has recording tracks 11 and grooves 12 that extend along the recording tracks 11. Each land 13 provided between two adjacent grooves 12 is used as a signal-recording region, in which signals will be recorded by means of magneto-optical recording.

On the magneto-optical disk 10, the grooves 12 are discontinuous, and non-groove regions on the tracks are provided at substantially the same position with respect to the tracks. Track-counting U-grooves 14 are made in those parts of the non-groove regions (i.e., header regions H) which correspond to the lands 13.

Each of the track-counting U-grooves 14 is an integral groove consisting of an M part 101 and an S part 102. The S part 102 has a predetermined depth measured from the surface of the land 13, which is a reference surface. The M part 101 has a predetermined width measured the surface of the S part 102. The track-counting U-groove 14 extends along the recording track 11, substantially aligned with the center line of that part of the non-groove region which corresponds to the land 13.

The depth $D_1$ of the M part 101 and the depth $D_2$ of the S part 102, both measured from the surface of the land 13 at the M part 101 satisfy the relation of $\lambda/(4n) < D_2 < D_1 < \lambda/(2n)$, where $\lambda$ is the wavelength of the reading laser beam and n is the refractive index of the disk substrate. In other words, both the depth $D_1$ of the M part 101 and the depth $D_2$ of the S part 102, measured from the surface of the land 13, are greater than a quarter (¼) of $\lambda/n$ and less than ½ of $\lambda/n$. In addition, the depth $D_1$ from the surface of the land 13 of the M part 101 is greater than the depth $D_2$ from the surface of the land 13 of the S part 102.

The width $W_1$ of the M part 101 and the width $W_2$ of the S part 102 are set at the same value which is equal to or less than half (½) the pitch of the recording tracks 11.

The grooves 12 made in the magneto-optical disk 10 have a depth $D_3$ from the surfaces of the lands 13. The depth $D_3$ is set at a value that satisfies the relation of $D_3 < \lambda/(4n)$, where $\lambda$ is the wavelength of the reading laser beam and n is the refractive index of the disk substrate. In other words, the depth $D_3$ of the grooves 12 measured from the surfaces of the lands 13 is set less than a quarter (¼) of $\lambda/n$.

The width $W_3$ of the grooves 12 is set at half (½) the pitch of the recording tracks 11 or less than half (½) the pitch of the track 11.

On the magneto-optical disk 10 so structured, a seek operation is carried out to access a desired recording track 11. When the light spot of the reading laser beam moves across a region where a groove 12 is made, during the seek operation, a signal is generated by applying the beam to the groove 12. The track is counted on the basis of the signal. When the light spot moves across a region where no grooves 12 are made, i.e., a header region H where a track-counting U-groove 14 is made, a signal is generated by applying the beam to the track-counting U-groove 14. The track is counted on the basis of this signal.

In this case, the depths $D_1$ and $D_2$ of the M part and S part of the track-counting U-groove 14, both measured from the surface of the land 13, are greater than a quarter (¼) of $\lambda/n$ and less than half (½) the $\lambda/n$. Further, the depth $D_3$ of the groove 12 measured from the surfaces of the land 13 is set less than a quarter (¼) of $\lambda/n$. Hence, the signal generated by applying the reading laser beam to the groove 12 has the same polarity as the signal generated by applying the reading laser beam to the track-counting U-groove 14 made at a distance of about half the track pitch from the groove 12. Thus, the tracks can be reliably counted on the magneto-optical disk 10 even if the light spot of the reading laser beam moves across the non-groove region. The desired track 11 can thereby be accessed.

This magneto-optical disk 10 is characterized in that the M part 101 of each track-counting U-groove 14 has a depth $D_1$ from the surface of the land 13, which is greater than the depth $D_2$ of the S part 102 measured from the surface of the land 13. Therefore, the pit pattern can have a reproducing modulation factor that can be read.

The magneto-optical disk 10 is characterized, also in that the grooves 12 are discontinuous and that a track-counting U-groove 14 is made in the non-groove region of each track. Therefore, each groove 12 and the track-counting U-groove 14 do not interfere with each other even if the pitch of the recording tracks 11 is short and the width of the land 13 between two adjacent grooves 12 is therefore small.

Hence, with the magneto-optical disk 10 it is possible to decrease the track pitch, thereby to enhance the surface-recording density.

Particularly in recent years, the technique of decreasing the track pitch by the use of magnetically-induced super resolution has been proposed. This technique may be applied to the magneto-optical disk 10 to increase the surface-recording density greatly, without causing the problem that each groove 12 interferes interfere with a track-counting U-groove 14.

Figure 7:
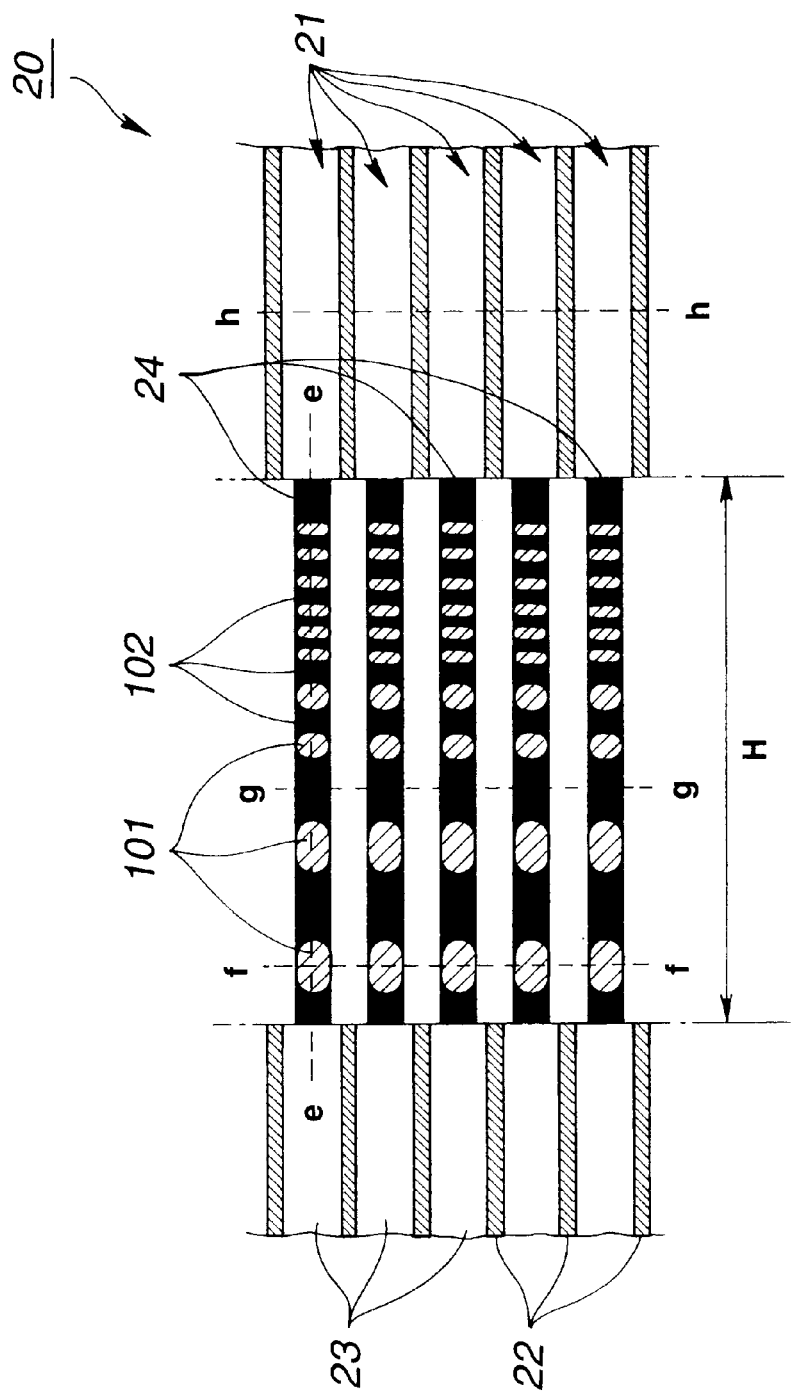
FIG. 7 is a magnified view of a part of the recording area of another type of a magneto-optical disk according to this invention.
Figure 8:
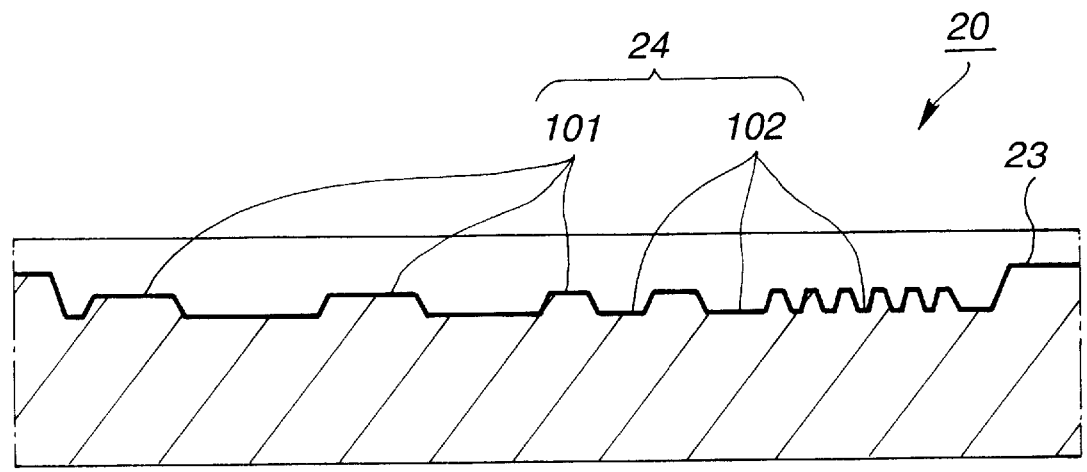
FIG. 8 is a sectional view taken along line VIII—VIII in FIG. 7.
Figure 9:
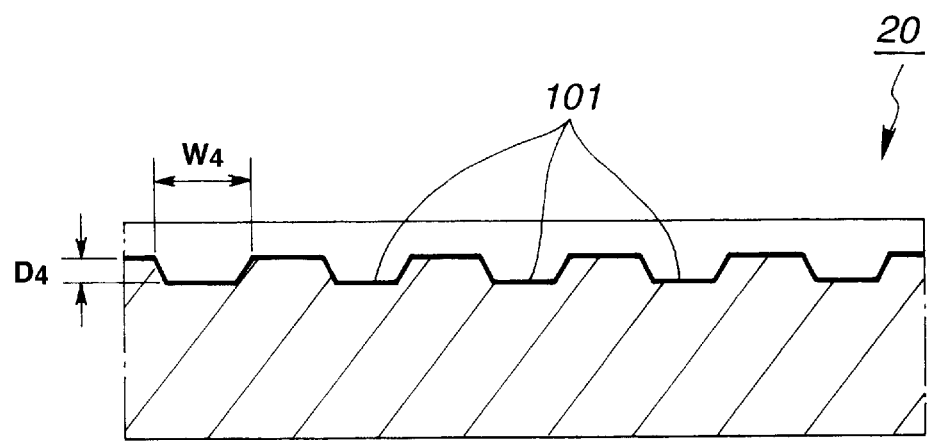
FIG. 9 is a sectional view taken along line IX—IX in FIG. 7.
Figure 10:
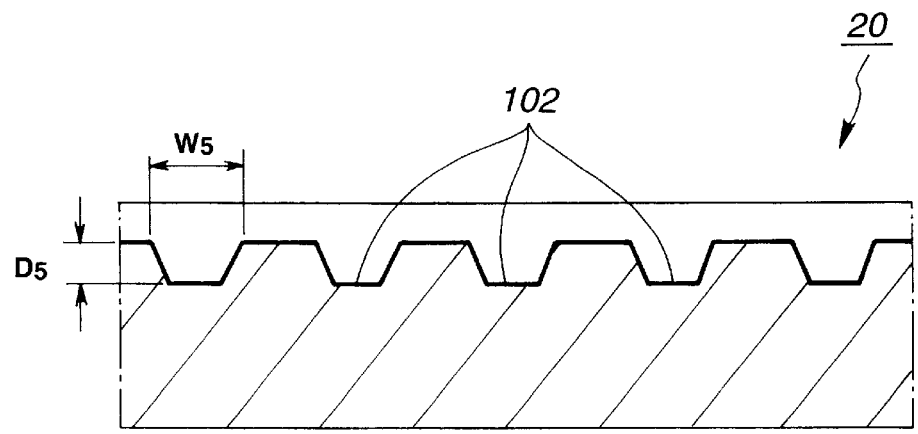
FIG. 10 is a sectional view taken along line X—X in FIG. 7.
Figure 11:
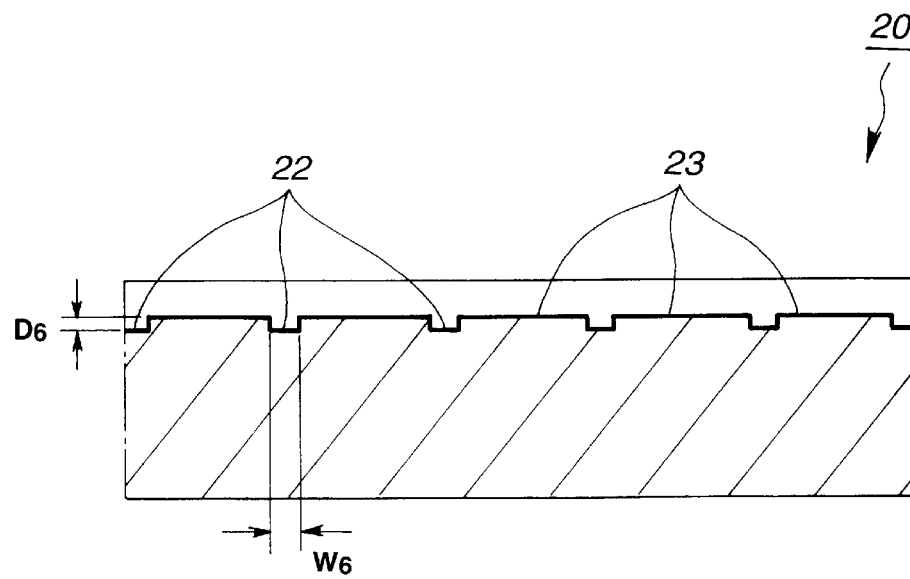
FIG. 11 is a sectional view taken along line XI—XI in FIG. 7.

The embodiment described above is a magneto-optical disk 10 characterized in that the M part 101 of each track-counting U-groove 14 has a depth $D_1$ from the surface of the land 13, which is greater than the depth $D_2$ of the S part 102 measured from the surface of the land 13. Nonetheless, the magneto-optical disk according to the present invention is not limited to the embodiment. Rather, the M part 101 may have a depth smaller than the depth of the S part 102, either depth measured from the surface of the land, as is illustrated in FIGS. 7 to 11. FIG. 7 is a magnified view of one part of the recording area of a magneto-optical disk 20 according to this invention. FIG. 8 is a sectional view taken along line VIII—VIII in FIG. 7; FIG. 9 is a sectional view taken along line IX—IX in FIG. 7; FIG. 10 is a sectional view taken along line X—X in FIG. 7; FIG. 11 is a sectional view taken along line XI—XI in FIG. 7.

Like the magneto-optical disk 10 described above, the magneto-optical disk 20 shown in FIGS. 7 to 11 has grooves 22, each made in the boundaries between two adjacent recording tracks 21. Each land 23 between two adjacent grooves 22 is used as a signal-recording region for recording signals by means of magneto-optical recording.

Like the grooves 11 made in the magneto-optical disk 10 described above, the grooves 22 are discontinuous. Non-groove regions are provided at substantially the same position with respect to the recording tracks 21. Track-counting U-grooves 24 are made in those parts of the non-groove regions (i.e., header regions H) which correspond to the lands 23.

Each of the track-counting U-grooves 24 is an integral groove consisting of an M part 101 and an S part 102. The track-counting U-groove 24 extends along the recording track 21, substantially aligned with the center line of that part of the non-groove region which corresponds to the land 23.

The depth $D_4$ of the M part 101 and the depth $D_5$ of the S part 102, both measured from the surface of the land 23 at the M part 101 satisfy the relation of $\lambda/(4n)<D_4<D_5<\lambda/(2n)$, where $\lambda$ is the wavelength of the reading laser beam and n is the refractive index of the disk substrate. In other words, both the depth $D_4$ of the M part 101 and the depth $D_5$ of the S part 102, measured from the surface of the land 23, are greater than a quarter (¼) of $\lambda/n$ and less than half (½) of $\lambda/n$. In addition, the depth $D_4$ from the surface of the land 23 of the M part 101 is less than the depth $D_5$ from the surface of the land 23 of the S part 102.

The width $W_4$ of the M part 101 and the width $W_5$ of the S part 102 are set at the same value which is equal to or less than half (½) the pitch of the recording tracks 21.

As in the magneto-optical disk 10 described above, the grooves 22 have a depth $D_6$ from the surfaces of the lands 23. The depth $D_6$ is set at a value that satisfies the relation of $D_6<\lambda/(4n)$, where $\lambda$ is the wavelength of the reading laser beam and n is the refractive index of the disk substrate. In other words, the depth $D_6$ of the grooves 22 measured from the surfaces of the lands 23 is set less than a quarter (¼) of $\lambda/n$.

The width $W_6$ of the grooves 22 is set at half (½) the pitch of the recording tracks 21 or less than half (½) the pitch of the track 21.

On the magneto-optical disk 20 so structured, a seek operation is carried out to access a desired recording track 21. When the light spot of the reading laser beam moves across a region where a groove 22 is made, during the seek operation, a signal is generated by applying the beam to the groove 22. The track is counted on the basis of the signal as with the magneto-optical disk 10 described above. When the light spot moves across a region where no grooves 22 are made, i.e., a header region H where a track-counting U-groove 24 is made, a signal is generated by applying the beam to the track-counting U-groove 24. The track is counted on the basis of this signal.

In this case, the depths $D_4$ and $D_5$ of the M part 101 and S part 102 of the track-counting U-groove 24, both measured from the surface of the land 23, are greater than a quarter (¼) of $\lambda/n$. Further, the depth $D_6$ of the groove 22 measured from the surfaces of the land 23 is set less than a quarter (¼) of $\lambda/n$. Hence, the signal generated by applying the reading laser beam to the groove 22 has the same polarity as the signal generated by applying the reading laser beam to the track-counting U-groove 24 made at a distance of about half the track pitch from the groove 22. Thus, the tracks can be reliably counted on the magneto-optical disk 20. The desired track 21 can thereby be accessed.

This magneto-optical disk 20 is characterized in that the M part 101 of each track-counting U-groove 14 has a depth $D_4$ from the surface of the land 23, which is greater than the depth $D_5$ of the S part 102 measured from the surface of the land 23. Therefore, the pit pattern can have a reproducing modulation factor that can be read.

The magneto-optical disk 20 is characterized, also in that the grooves 22 are discontinuous and that a track-counting U-groove 24 is made in the non-groove region of each track. Therefore, each groove 22 and the track-counting U-groove 24 do not interfere with each other even if the pitch of the recording tracks 21 is short and the width of the land 23 between two adjacent grooves 22 is therefore small.

Hence, with the magneto-optical disk 20 it is possible to decrease the track pitch by utilizing, for example, magnetically-induced super resolution, thereby to enhance the surface-recording density.

(Embodiment Wherein M and S Parts Have Different Widths)

Figure 12:
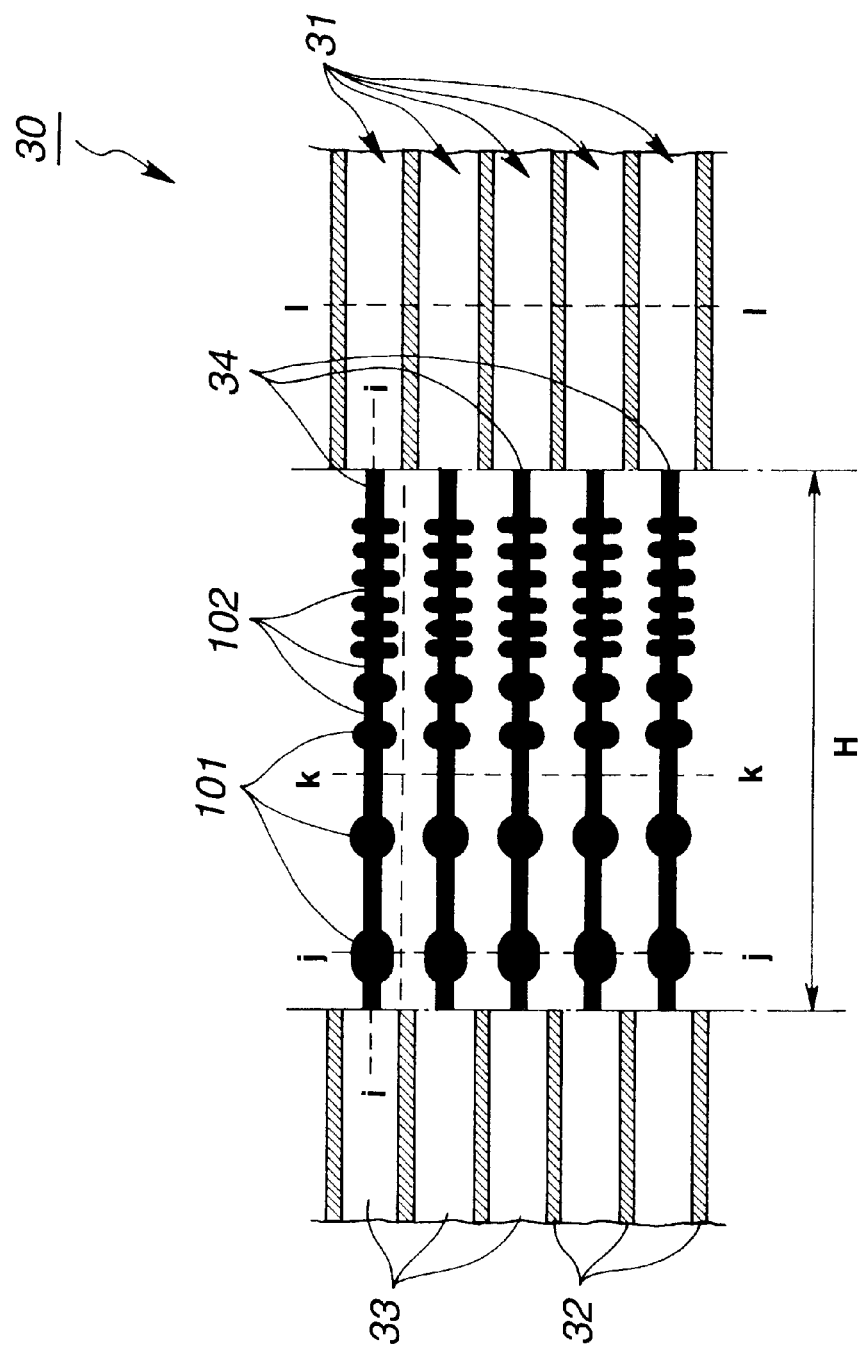
FIG. 12 is a magnified view of a part of the recording area of still another type of a magneto-optical disk according to the invention.
Figure 13:
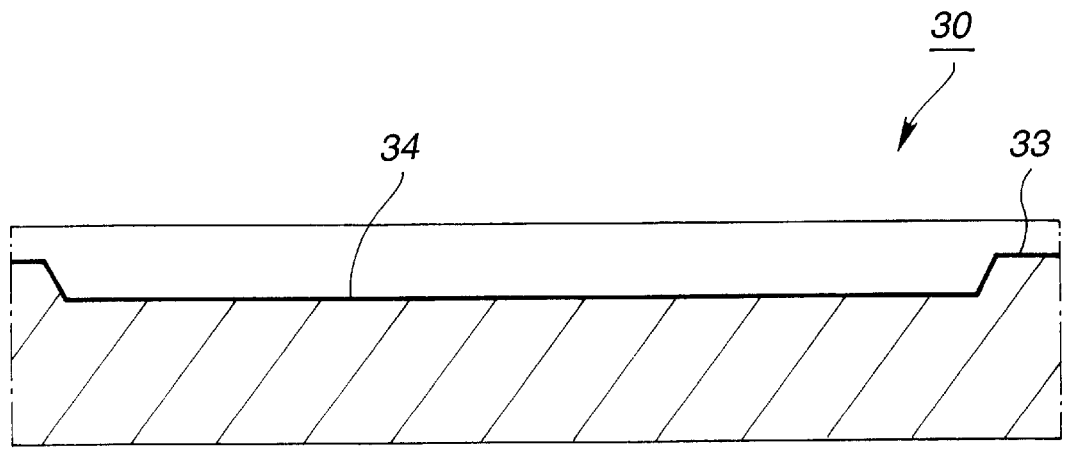
FIG. 13 is a sectional view taken along line XIII—XIII in FIG. 12.
Figure 14:
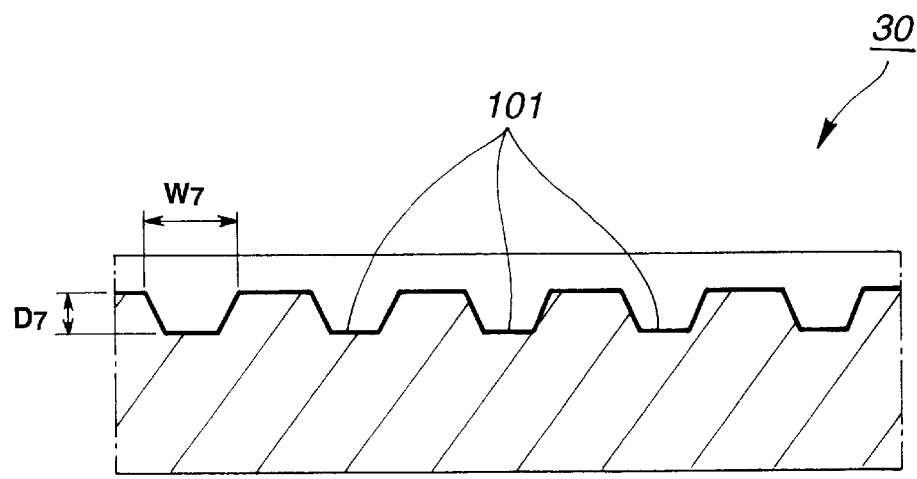
FIG. 14 is a sectional view taken along line XIV—XIV in FIG. 12.
Figure 15:
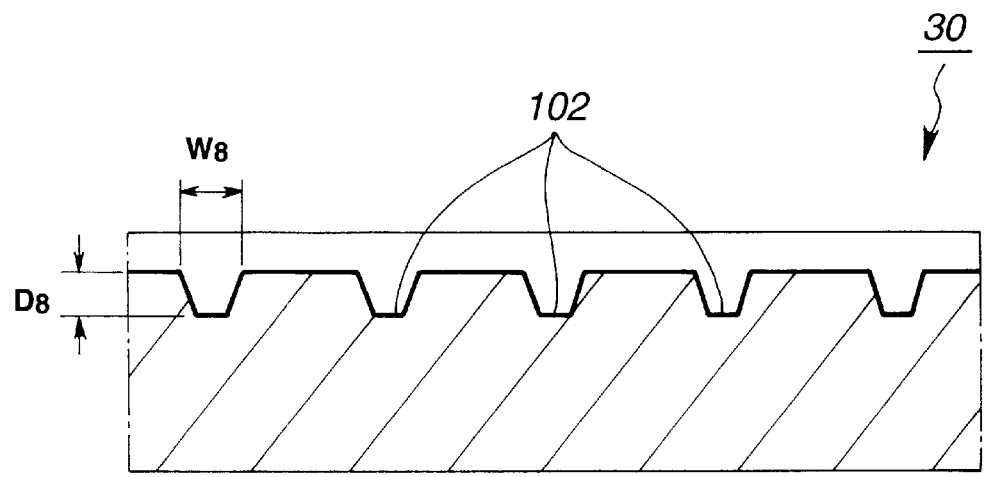
FIG. 15 is a sectional view taken along line XV—XV in FIG. 12.
Figure 16:
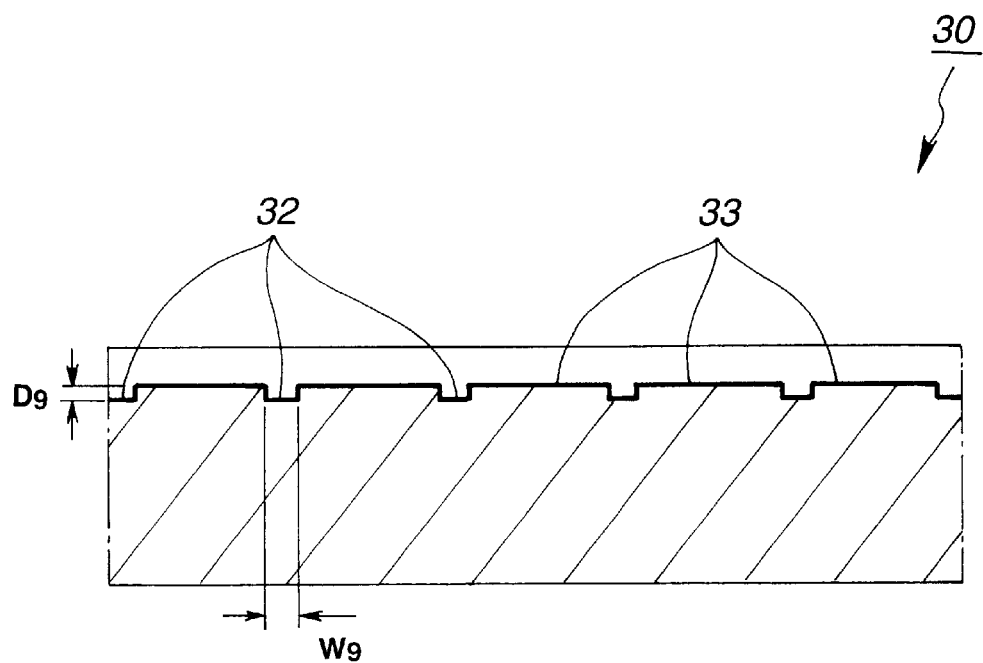
FIG. 16 is a sectional view taken along line XVI—XVI in FIG. 12.

FIGS. 12 to 16 shows a magneto-optical disk according to the invention. In this embodiment, the M part 101 and the S part 102 differ in width, imparting to the pit pattern a reproducing modulation factor that can be read. FIG. 12 is a magnified view of a part of the recording area of a magneto-optical disk 30 according to this embodiment. FIG. 13 is a sectional view taken along line XIII—XIII in FIG. 12; FIG. 14 is a sectional view taken along line XIV—XIV in FIG. 12; FIG. 15 is a sectional view taken along line XV—XV in FIG. 12, and FIG. 16 is a sectional view taken along line XVI—XVI in FIG. 12.

Like the magneto-optical disks 10 and 20 described above, the magneto-optical disk 30 shown in FIGS. 12 to 16 has grooves 32, each made in the boundaries between two adjacent recording tracks 31. Each land 33 between two adjacent grooves 32 is used as a signal-recording region for recording signals by means of magneto-optical recording.

Like the grooves 11 and 21 made in the magneto-optical disks 10 and 20 described above, respectively, the grooves 32 are discontinuous. Non-groove regions are provided at substantially the same position with respect to the recording tracks 31. Track-counting U-grooves 34 are made in those parts of the non-groove regions (i.e., header regions H) which correspond to the lands 33.

Each of the track-counting U-grooves 34 is an integral groove consisting of an M part 101 and an S part 102. The M part 101 has the same depth as the S part 102 and a larger width than the S part 102. The track-counting U-groove 34 extends along the recording track 31, substantially aligned with the center line of that part of the non-groove region which corresponds to the land 33.

The depth $D_7$ of the M part 101 and the depth $D_8$ of the S part 102, both measured from the surface of the land 33 satisfy the relation of $\lambda/(4n)<D_7<\lambda/(2n)$ and the relation of $\lambda/(4n)<D_8<\lambda/(2n)$, where $\lambda$ is the wavelength of the reading laser beam and n is the refractive index of the disk substrate. In other words, both the depth $D_7$ of the M part 101 and the depth $D_8$ of the S part 102, measured from the surface of the land 33, are greater than a quarter (¼) of $\lambda/n$ and less than half (½) of $\lambda/n$. Further, the depth $D_7$ from the surface of the land 33 of the M part 101 and the depth $D_8$ from the surface of the 33 of the part 102 are set at the same value.

The width $W_7$ of the M part 101 and the width $W_8$ of the S part 102 are set at values which are equal to or less than half (½) the pitch of the recording tracks 31. In addition, the width $W_7$ of the M part 101 is greater than the width $W_8$ of the S part 102

The magneto-optical disk 30 is characterized in that the grooves 32 have a depth $D_9$ from the surfaces of the lands 33, which is set at a value that satisfies the relation of $D_9<\lambda/(4n)$, where A is the wavelength of the reading laser beam and n is the refractive index of the disk substrate. In other words, the depth $D_9$ of the grooves 32 measured from the surfaces of the lands 33 is set less than a quarter (¼) of $\lambda/n$.

The width $W_9$ of the grooves 32 is set at half (½) the pitch of the recording tracks 31 or less than half (½) the pitch of the track 31.

On the magneto-optical disk 30 so structured, a seek operation is carried out to access a desired recording track 31. When the light spot of the reading laser beam moves across a region where a groove 32 is made, during the seek operation, a signal is generated by applying the beam to the groove 32. The track is counted on the basis of the signal as with the magneto-optical disks 10 and 20 described above. When the light spot moves across a region where no grooves 32 are made, i.e., a header region H where a track-counting U-groove 34 is made, a signal is generated by applying the beam to the track-counting U-groove 34. The track is counted on the basis of this signal.

In this case, the depths $D_7$ and $D_8$ of the M part 101 and S part 102 of the track-counting U-groove 34, both measured from the surface of the land 33, are greater than a quarter (¼) of $\lambda/n$. Further, the depth $D_9$ of the groove 32 measured from the surfaces of the land 33 is set less than a quarter (¼) of $\lambda/n$. Hence, the signal generated by applying the reading laser beam to the groove 32 has the same polarity as the signal generated by applying the reading laser beam to the track-counting U-groove 34 made at a distance of about half (½) the track pitch from the groove 32. Thus, the tracks can be reliably counted on the magneto-optical disk 30. The desired track 31 can thereby be accessed.

This magneto-optical disk 30 is designed such that the M part 101 of each track-counting U-groove 34 has a width $W_7$ that is greater than the width $W_8$ of the S part 102. Hence, it is possible to impart to the pit pattern a reproducing modulation factor that can be read.

The magneto-optical disk 30 is characterized, also in that the grooves 32 are discontinuous and that a track-counting U-groove 34 is made in the non-groove region of each track. Therefore, each groove 32 and the track-counting U-groove 34 do not interfere with each other even if the pitch of the recording tracks 31 is short and the width of the land 33 between two adjacent grooves 32 is therefore small.

Hence, with the magneto-optical disk 30 it is possible to decrease the pitch of the recording tracks 31 by utilizing, for example, magnetically-induced super resolution, thereby to enhance the surface-recording density very much.

Figure 17:
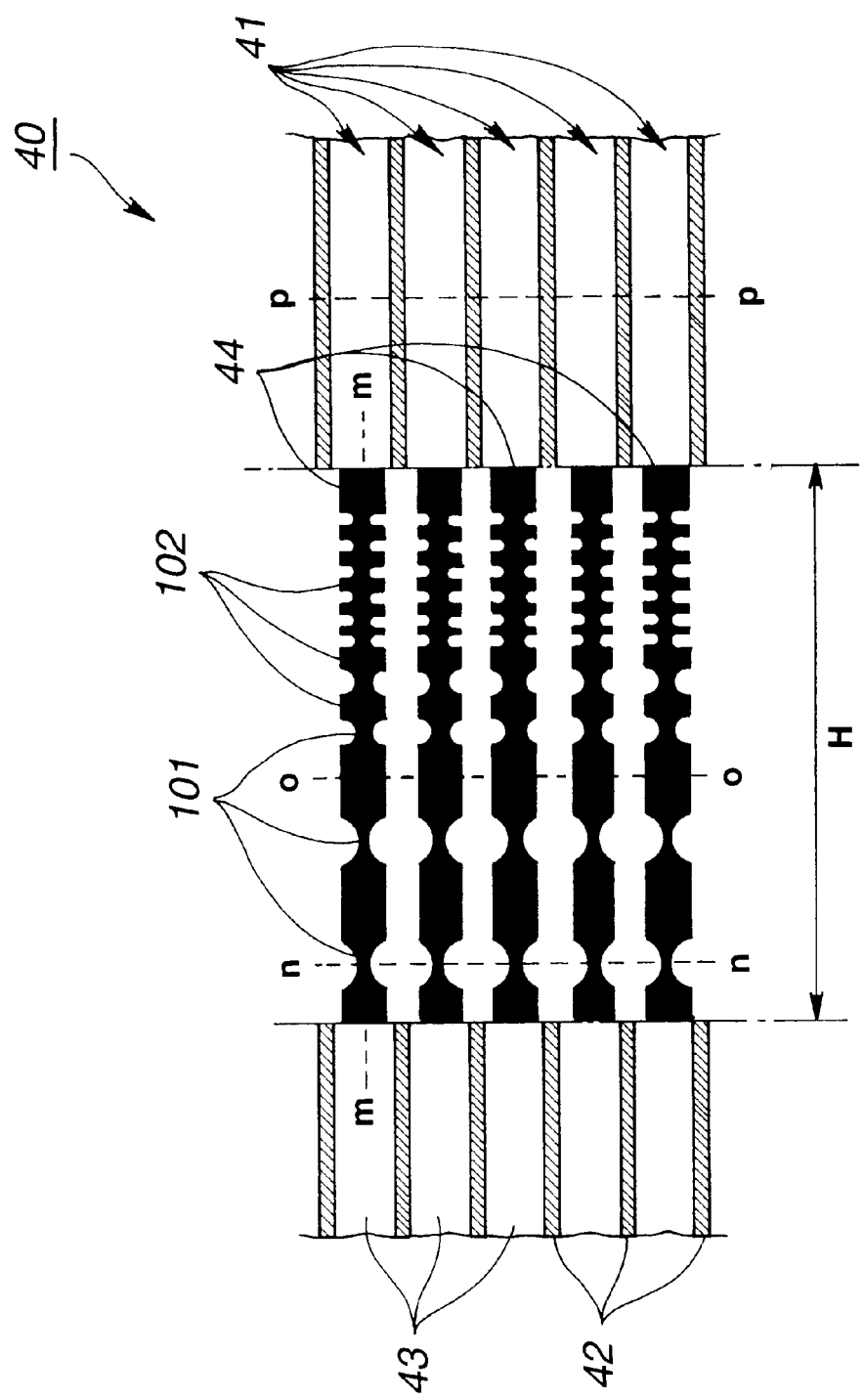
FIG. 17 is a magnified view of a part of the recording area of another type of a magneto-optical disk according to the present invention.
Figure 18:
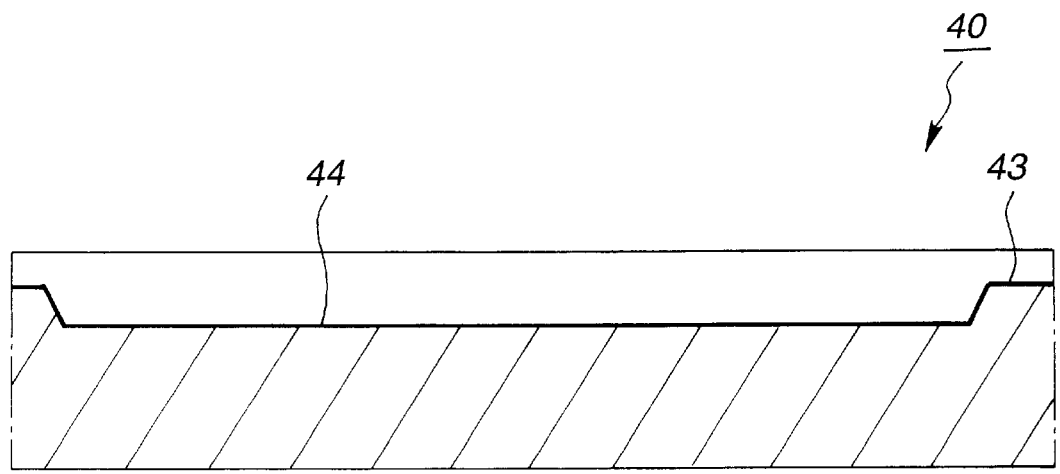
FIG. 18 is a sectional view taken along line XVIII—XVIII in FIG. 17.
Figure 19:
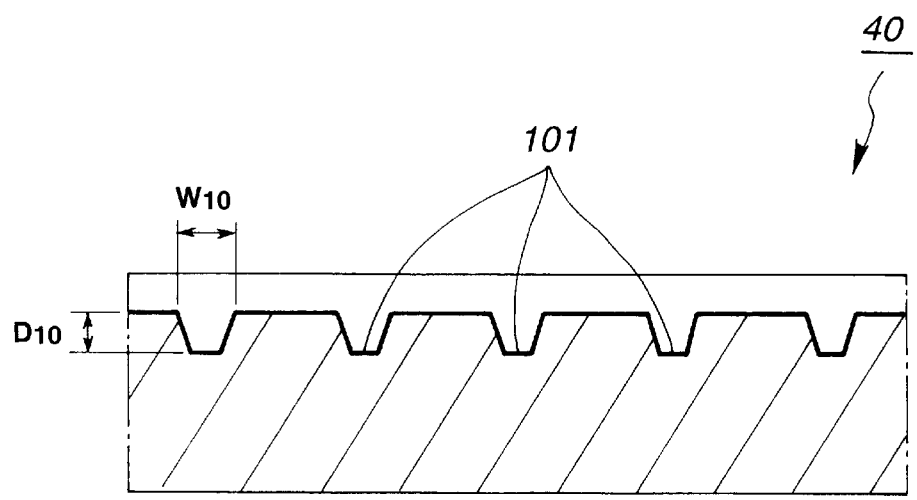
FIG. 19 is a sectional view taken along line XIX—XIX in FIG. 17.
Figure 20:
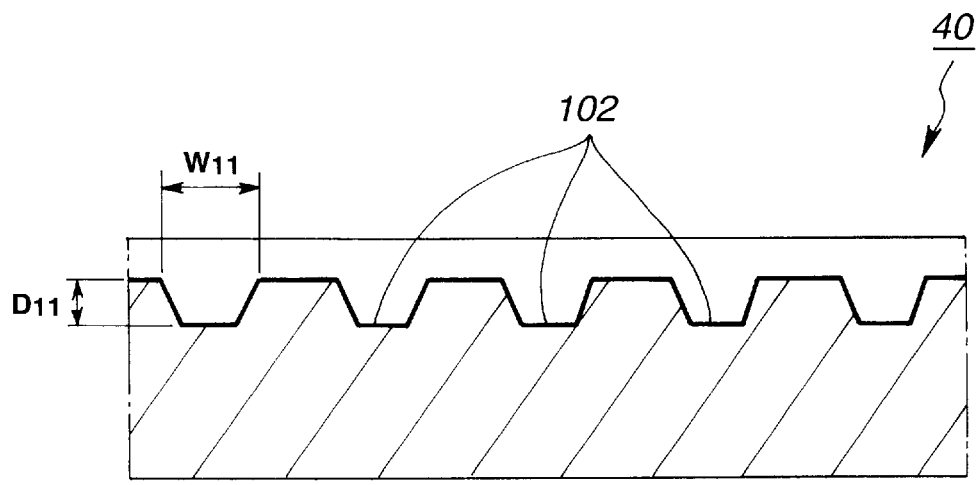
FIG. 20 is a sectional view taken along line XX—XX in FIG. 17.
Figure 21:
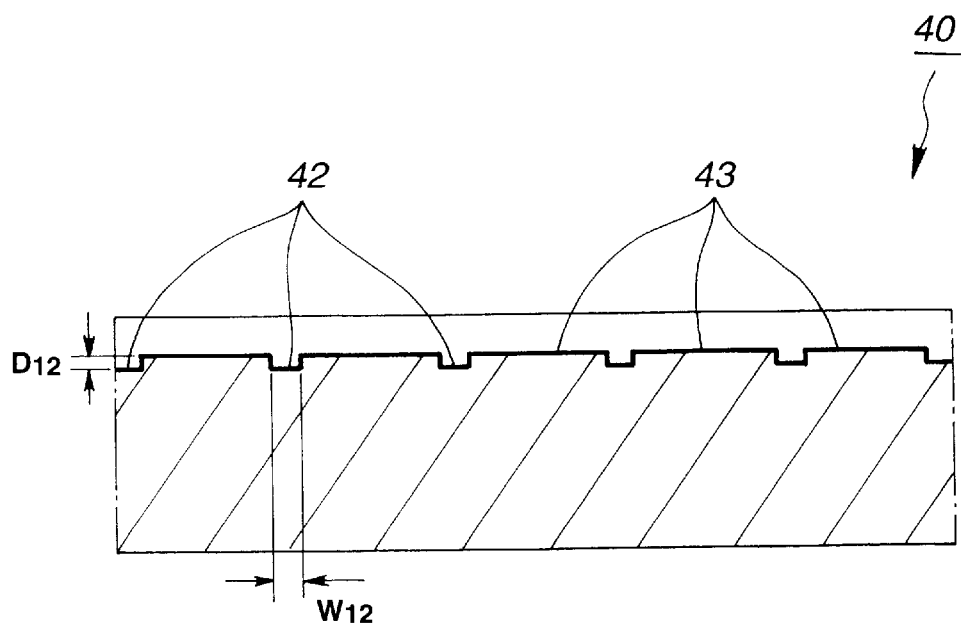
FIG. 21 is a sectional view taken along line XXI—XXI in FIG. 17.

The magneto-optical disk 30 has been described, which is characterized in that the M part 101 has a width $W_7$ that is greater than the width $W_8$ of the S part 102. Nonetheless, the magneto-optical disk according to the present invention is not limited to this embodiment. Rather, the M part 101 may have a width smaller than the width of the S part 102, as is illustrated in FIGS. 17 to 21. FIG. 17 is a magnified view of one part of the recording area of a magneto-optical disk 40 according to this invention. FIG. 18 is a sectional view taken along line XVIII—XVIII in FIG. 17; FIG. 19 is a sectional view taken along line XIX—XIX in FIG. 17; FIG. 20 is a sectional view taken along line XX—XX in FIG. 17; FIG. 21 is a sectional view taken along line XXI—XXI in FIG. 17.

Like the magneto-optical disks 10, 20 and 30 described above, the magneto-optical disk 40 shown in FIGS. 17 to 21 has grooves 42, each made in the boundaries between two adjacent recording tracks 41. Each land 43 between two adjacent grooves 42 is used as a signal-recording region for recording signals by means of magneto-optical recording.

Like the grooves 11, 21 and 31 made in the magneto-optical disks 10, 20 and 30 described above, the grooves 42 are discontinuous. Non-groove regions are provided at substantially the same position with respect to the recording tracks 41. Track-counting U-grooves 44 are made in those parts of the non-groove regions (i.e., header regions H) which correspond to the lands 43.

Each of the track-counting U-grooves 44 has a predetermined depth from the surface of the land 43, which is the reference surface. The U-groove 44 is an integral groove consisting of an M part 101 and an S part 102. The track-counting U-groove 44 extends along the recording track 41, substantially aligned with the center line of that part of the non-groove region which corresponds to the land 43.

The depth $D_{10}$ of the M part 101 and the depth $D_{11}$ of the S part 102, both measured from the surface of the land 43 satisfy the relation of $\lambda/(4n)<D_{10}<\lambda/(2n)$ and the relation of $\lambda/(4n)<D_{11}<\lambda/(2n)$, where $\lambda$ is the wavelength of the reading laser beam and n is the refractive index of the disk substrate. In other words, both the depth $D_{10}$ of the M part 101 and the depth $D_{11}$ of the S part 102, measured from the surface of the land 43, are greater than a quarter (¼) of $\lambda/n$ and less than half (½) of $\lambda/n$. Further, the depth $D_{10}$ from the surface of the land 43 of the M part 101 and the depth $D_{11}$ from the surface of the 43 of the S part 102 are set at the same value.

The width $W_{10}$ of the M part 101 and the width $W_{11}$ of the S part 102 are set at values which are equal to or less than half (½) the pitch of the recording tracks 41. Moreover, the width $W_{10}$ of the M part 101 is smaller than the width $W_{11}$ of the S part 102.

The magneto-optical disk 40 is characterized in that the grooves 42 have a depth $D_{12}$ from the surfaces of the lands 43, which is set at a value that satisfies the relation of $D_{12}<\lambda/(4n)$, where $\lambda$ is the wavelength of the reading laser beam and n is the refractive index of the disk substrate. In other words, the depth $D_{12}$ of the grooves 42 measured from the surfaces of the lands 43 is set less than a quarter (¼) of $\lambda/n$.

The width $W_{12}$ of the grooves 42 is set at half (½) the pitch of the recording tracks 41 or less than half (½) the pitch of the track 41.

On the magneto-optical disk 40 so structured, a seek operation is carried out to access a desired recording track 41. When the light spot of the reading laser beam moves across a region where a groove 42 is made, during the seek operation, a signal is generated by applying the beam to the groove 42. The track is counted on the basis of the signal as with the magneto-optical disks 10, 20 and 30 described above. When the light spot moves across a region where no grooves 42 are made, i.e., a header region H where a track-counting U-groove 44 is made, a signal is generated by applying the beam to the track-counting U-groove 44. The track is counted on the basis of this signal.

In this case, the depths $D_{10}$ and $D_{11}$ of the M part 101 and S part 102 of the track-counting U-groove 44, both measured from the surface of the land 43, are greater than a quarter (¼) of $\lambda/n$. Further, the depth $D_{12}$ of the groove 42 measured from the surfaces of the land 43 is set less than a quarter (¼) of $\lambda/n$. Hence, the signal generated by applying the reading laser beam to the groove 42 has the same polarity as the signal generated by applying the reading laser beam to the track-counting U-groove 44 made at a distance of about half (½) the track pitch from the groove 42. Thus, the tracks can be reliably counted on the magneto-optical disk 40. The desired track 41 can thereby be accessed.

This magneto-optical disk 40 is designed such that the M part 101 of each track-counting U-groove 44 has a width $W_{10}$ that is smaller than the width $W_{11}$ of the S part 102. Hence, it is possible to impart to the pit pattern a reproducing modulation factor that can be read.

The magneto-optical disk 40 is characterized, also in that the grooves 42 are discontinuous and that a track-counting U-groove 44 is made in the non-groove region of each track. Therefore, each groove 42 and the track-counting U-groove 44 do not interfere with each other even if the pitch of the recording tracks 41 is short and the width of the land 43 between two adjacent grooves 42 is therefore small.

Therefore, with the magneto-optical disk 40 it is possible to decrease the pitch of the recording tracks 41 by utilizing, for example, magnetically-induced super resolution, thereby to enhance the surface-recording density very much.

A method of manufacturing the magneto-optical disks of this invention, described above, will be explained below.

Any magneto-optical disk according to the invention is manufactured by forming a magneto-optical layer on a disk substrate and then a protective layer on the magneto-optical layer, as has been indicated above.

The substrate of the magneto-optical disk is obtained by injecting disk material heated and melted, into a cavity of a mold set in an injection molding apparatus. The mold is composed of a pair of metal mold halves, and a master disk is arranged in the cavity of the mold. The master disk has, on its surface, a reversed groove pattern and a reversed pit pattern.

The master disk used to manufacture the disk substrate is produced in the following manner.

First, the major surface of a disc-shaped glass substrate, which has been polished with high precision was coated with a close-contact adhesive. The major surface of the glass substrate is then coated with a photoresist having a uniform thickness and being sufficiently sensitive to the wavelength of the laser beam emitted from an exposure apparatus. The organic solvent in the photoresist is made to evaporate, whereby a photoresist layer is formed on the glass substrate.

The glass substrate, now having the photoresist layer formed on it, is set in the exposure apparatus. The exposure apparatus applies a laser beam to the photoresist layer formed on the glass substrate, thus scanning the photoresist layer.

A latent image corresponding to the grooves and track-counting U-grooves of a magneto-optical disk to be manufactured is thereby formed on the photoresist layer. The master disk may be one for manufacturing a magneto-optical disk that has track-counting U-grooves, each having M and S parts of different depths, like the magneto-optical disk 10 shown in FIGS. 2 to 6 and the magneto-optical disk 20 shown in FIGS. 7 to 11.

To produce such a master disk, two laser beams having different intensities are applied, respectively, to those two parts of the photoresist layer which corresponds to the M part and S part. An latent image corresponding to the M part is formed to a depth, and an latent image corresponding to the S part is formed to a different depth.

Next, an alkaline developing solution is applied to the resist layer, thereby developing the latent images formed on the resist layer. As a result, a master resist is made, which has a recess-projection pattern that corresponds to prescribed grooves and track-counting U-grooves.

Then, a metal film, such as a silver film, nickel film or the like, is formed on the major surface of the master resist, which has the recess-projection pattern, by means of sputtering, vapor deposition, electroless plating, or the like.

Further, the master resist, now having the metal film, is set in an electro-plating apparatus. Electro-plating is carried out, using the metal film as an electrode. An electro-plated layer is thereby formed on the major surface of the master resist.

The master resist is peeled from the metal film and the electroplated layer. The residual metal film is removed by means of pressing. A master disk is thereby manufactured.

In the method described above, a latent image corresponding to the track-counting U-grooves can be reliably formed, merely by changing the laser beam to be applied to the photoresist layer, in terms of intensity or diameter. The magneto-optical disk according to the present invention can therefore be manufactured with ease.

INDUSTRIAL APPLICABILITY

The optical recording medium according to this invention has detection patterns, each provided in a non-groove region and used to optically detect that the light spot of a reading laser beam has crossed a recording track. In the course of accessing a track, it is detected that the light spot moves across a recording track when the light spot moves over a detection pattern. This makes it possible to access a track at a high speed.

The optical recording medium substrate according to the invention has detection patterns, each provided in a non-groove region and used to optically detect that the light spot of a reading laser beam has crossed a recording track. In the course of accessing a track on an optical recording medium manufactured by the use of the optical recording medium, the light spot is detected to cross a recording track when it moves over the detection pattern. Any recording track can therefore be accessed reliably at a high speed.

In the method of manufacturing a master disk, according to this invention, a laser beam of a certain intensity is applied to a part of a photosensitive layer, which corresponds to a pit pattern, and a laser beam of a different intensity is applied to the other part of the layer, in the process of forming a latent image of a detection pattern on the photosensitive layer by applying laser beams thereto. Therefore, a latent image of a specific depth is formed on the part corresponding to the pit pattern, while a latent image of a different depth is formed on the other part. Thus, it is easy to form a latent image having a specific depth at the part corresponding to the pit pattern and a different depth at the other part.

In the other method of manufacturing a master disk, according to the present invention, a laser beam of a certain diameter is applied to a part of a photosensitive layer, which corresponds to a pit pattern, and a laser beam of a different diameter is applied to the other part of the layer, in the process of forming a latent image of a detection pattern on the photosensitive layer by applying laser beams thereto. As a result, a latent image having a certain width is formed on the part corresponding to the pit pattern, while a latent image having a different width is formed on the other part. Hence, it is easy to form a latent image having a specific width at the part corresponding to the pit pattern and a different width at the other part.

In the method of accessing tracks, according to the present invention, tracks are counted at non-groove regions on the basis of the information optically obtained from a detection pattern, and at groove regions on the basis of the information optically obtained from the grooves. Hence, the tracks can be reliably counted, making it possible to access a desired track at a high speed.

We claim:

1. An optical recording medium, comprising:
    recording tracks which comprise track lands positioned on a first side of the optical recording medium and formed along track grooves, the track grooves being one of concentric grooves and a spiral groove;
    wherein the Track lands are provided between the track grooves, information being recorded only on said track lands; and
    a recording area positioned on the first side of the optical recording medium and which has non-track groove regions where none of the track grooves are made, each non-track groove region having a pit recording region;
    wherein the recording area further includes an embossed pit pattern formed in the pit recording region and representing information about each of the recording tracks;

wherein the recording area further includes a detection pattern provided in one of the non-track groove regions and configured to permit optical detection of movement of a light spot of a reading laser beam across one of the recording tracks, said embossed pit pattern and said detection pattern being formed at a distance of a half track pitch from an extension of one of said track grooves in a direction at right angles to said recording track;

wherein the detection pattern has a different shape from said embossed pit pattern and comprises a track counting groove having a center that is aligned with a center of each of the track lands;

wherein each track counting groove is recessed below each embossed pit pattern; and wherein a signal generated by applying said reading laser beam to said track grooves has a same polarity as a signal generated by applying said reading laser beam to said track counting grooves.

2. An optical recording medium according to claim 1, wherein each detection pattern is a U-groove along each of the recording tracks that is formed interleaved with the embossed pit pattern.

3. An optical recording medium according to claim 2, wherein the following formulae (1) to (4) are all satisfied:

$$Dg < \lambda/(4n) \quad (1)$$

$$\lambda/(4n) < Dp < \lambda/(2n) \quad (2)$$

$$\lambda/(4n) < Dh < \lambda/(2n) \quad (3)$$

$$Dp \neq Dh \quad (4)$$

where Dg is a depth of each of the track grooves, Dp is a depth of the embossed pit pattern, Dh is a depth of the U-groove, λ is a wavelength of the reading laser beam, and is a refractive index of a substrate of the optical recording medium.

4. An optical recording medium according to claim 2, wherein the following formulae (5) to (8) are all satisfied:

$$Dg < \lambda/(4n) \quad (5)$$

$$\lambda/(4n) < Dp < \lambda/(2n) \quad (6)$$

$$\lambda/(4n) < Dh < \lambda/(2n) \quad (7)$$

$$Wp \neq Wh \quad (8)$$

where Dg is a depth of each of the track grooves, Dp is a depth of the embossed pit pattern, Dh is a depth of the U-groove, Wp is a width of the embossed pit pattern, Wh is a width of the U-groove, λ is a wavelength of the reading laser beam, and n is a refractive index of a substrate of the optical recording medium.

5. An optical recording medium according to claim 2, wherein the following formulae (9) to (11) are all satisfied:

$$Wg < TP/2 \quad (9)$$

$$Wp < TP/2 \quad (10)$$

$$Wh < TP/2 \quad (11)$$

where Wg is a width of each of the track grooves, Wp is a width of the embossed pit pattern, Wh is a width of the U-groove, and TP is a pitch of each of the track lands.

6. An optical recording medium substrate, designed for use in an optical recording medium that has recording tracks which are formed along track grooves, the track grooves being one of concentric grooves and a spiral groove, the optical recording medium substrate comprising:

track lands which are positioned on a first side of the optical recording medium substrate and provided between the track grooves and on which information is to be recorded; and a recording area positioned on the first side of the optical recording medium substrate and which has non-track groove regions where none of the track grooves are made, each non-track groove region having a pit recording region;

wherein the recording area further includes and embossed pit pattern formed in the pit recording region and representing information about each of the recording tracks;

wherein the recording area further includes a detection pattern provided in one of the non-track groove regions and configured to permit optical detection of movement of a light spot of a reading laser beam across one of the recording tracks;

wherein the detection pattern has a different shape from said embossed pit pattern and comprises a track counting groove having a center that is aligned with a center of each of the track lands; and wherein each track counting groove is recessed below each embossed pit pattern.

7. An optical recording medium substrate according to claim 6, wherein each detection pattern is a U-groove along each of the recording tracks that is formed interleaved with the embossed pit pattern.

8. A method of manufacturing a master disk for use in manufacturing an optical recording medium that has recording tracks positioned on a first side of the optical recording medium and which comprise track lands formed along track grooves, the track grooves being one of concentric grooves and a spiral groove, where the track lands are provided between the track grooves and on which information is to be recorded, and a recording area is positioned on the first side of the optical recording medium and which has non-track groove regions where none of the track grooves are made, each non-track groove region having a pit recording region, the recording area further having an embossed pit pattern formed in the pit recording region and representing information about each of the recording tracks, and the recording area further having a detection pattern formed in one of the non-track groove regions and configured to permit optical detection of movement of a light spot of a reading laser beam across one of the recording tracks, where the detection pattern has a different shape from said embossed pit pattern and comprises a track counting groove having a center that is aligned with a center of each of the track lands, and where each track counting groove is recessed below each embossed pit pattern, the method comprising:

providing a substrate having a photosensitive layer; and applying a laser beam at a first intensity to that part of the photosensitive layer which corresponds to the embossed pit pattern and at a second intensity that is different from the first intensity to that other part of the photosensitive layer, to form a latent image corresponding to the detection pattern to a certain depth and the part corresponding to the embossed pit pattern, and to a different depth than the other part of the photosensitive layer.

9. A method of manufacturing a master disk for use in manufacturing an optical recording medium that has recording tracks positioned on a first side of the optical recording medium and which comprise track lands formed along track grooves, the track grooves being one of concentric grooves and a spiral groove, where the track lands are provided between the track grooves and on which information is to be recorded, and a recording area is positioned on the first side of the optical recording medium and which has non-track groove regions where none of the track grooves are made, each non-track groove region having a pit recording region, the recording area further having an embossed pit pattern formed in the pit recording region and representing information about each of the recording tracks, and the recording area further having a detection pattern formed in one of the recording non-track groove regions and configured to permit optical detection of movement of a light spot of a reading laser beam across one of the recording tracks, where the detection pattern has a different shape from said embossed pit pattern and comprises a track counting groove having a center that is aligned with a center of each of the track lands, and where each track counting groove is recessed below each embossed pit pattern, the method comprising:

providing a substrate with a photosensitive layer; and applying a laser beam with a first diameter to that part of the photosensitive layer which corresponds to the embossed pit pattern and with a second diameter that is different from the first diameter to the other part of the photosensitive layer to form a latent image corresponding to the detection pattern to a certain width and the part corresponding to the embossed pit pattern to a different width than the other part of the photosensitive layer.

10. A method of assessing tracks provided on an optical recording medium that has recording tracks positioned on a first side of the optical recording medium and which comprise track lands formed along track grooves, the track grooves being one of concentric grooves and a spiral groove, where the track lands are provided between the track grooves and on which information is to be recorded, and a recording area is positioned on the first side of the optical recording medium and which has non-track groove regions where none of the track grooves are made, each non-track groove region having a pit recording region, the recording area further having an embossed pit pattern formed in the pit recording region and representing information about each of the recording tracks, and a detection pattern formed in one of the non-track groove regions and configured to permit optical detection of movement of a light spot of a reading laser beam across one of the recording tracks, where the detection pattern has a different shape from said embossed pit pattern and comprises a track counting groove having a center that is aligned with a center of each of the track lands, and where each track counting groove is recessed below each embossed pit pattern, the method comprising:

performing a seeking operation on the optical recording medium to access a desired recording track by counting track counting grooves in the non-track groove regions on the basis of information optically obtained from the detection pattern and, for regions having track grooves, on the basis of information optically obtained from the track grooves.

11. An optical recording medium, comprising:

a plurality of recording tracks formed in a recording layer provided on a substrate, where each recording track comprises a track groove and a track land positioned between two adjacent track grooves, where each track groove is one of a concentric groove and a spiral groove, and where each track land is configured to embody recorded information;

a header region formed in the recording layer, where the header region does not include a track groove, where the header region includes one track-counting U-groove for each recording track and a header land positioned between two adjacent track-counting U-grooves, where a center of each track-counting U-groove is aligned with a center of a track land, and where a height of each header land is equal to a height of each track land to define a reference surface, wherein each track-counting U-groove comprises an M part and an S part, where each M part comprises a plurality of pits positioned in a pit pattern that represents information about a recording track, and where each S part comprises one of a plurality of U-grooves and a plurality of raised portions positioned in a detection pattern between one of two adjacent pits and a pit and an end of a track land, where each detection pattern is configured to enable optical detection that a light spot of a reading laser beam has moved across a recording track.

12. An optical recording medium according to claim 11, where each S part comprises a plurality of raised portions.

13. An optical recording medium according to claim 12, where $$Dg<\lambda/(4n)<Dh<Dp<\lambda/(2n),$$

where Dg is a depth of the track grooves, Dp is a depth of the pit patterns, Dh is a depth of the U-grooves, where Dg, Dp, and Dh are measured from a reference surface, where $\lambda$ is a wavelength of a reading laser beam, and n is a refractive index of the substrate.

14. An optical recording medium according to claim 13, where $$Wp \neq Wh,$$

where Wp is a width of the pit patterns and Wh is a width of the U-grooves.

15. An optical recording medium according to claim 14, where $$Wg<TP/2,\ Wp<TP/2,\ \text{and}\ Wh<TP/2,$$

where Wg is a width of the track grooves and TP is a pitch of the track lands.

16. An optical recording medium, comprising:

a recording layer formed on a substrate;

recording tracks formed on said recording layer, said recording tracks which comprise track lands positioned on a first side of the optical recording medium and formed along track grooves, the track grooves being one of concentric grooves and a spiral groove;

wherein the track lands are provided between the track grooves and on which information is to be recorded; and a recording area positioned on the first side of the optical recording medium and which has non-track groove regions where none of the track grooves are made, each non-track groove region having a pit recording region;

wherein the recording area further includes an embossed pit pattern pre-formed in the pit recording region and representing management information about each of the recording tracks;

wherein the recording area further includes a detection pattern pre-formed in one of the non-track groove regions and configured to permit optical detection of movement of a light spot of a reading laser beam across one of the recording tracks;

wherein the detection pattern comprises a track counting groove having a center that is aligned with a center of each of the track lands; and wherein each track counting groove is recessed below each embossed pit pattern.

17. An optical recording medium, comprising:

recording tracks which comprise track lands positioned on a first side of the optical recording medium and formed along track grooves, the track grooves being one of concentric grooves and a spiral groove;

wherein the track lands are provided between the track grooves and on which information is to be recorded; and a recording area positioned on the first side of the optical recording medium and which has non-track groove regions where none of the track grooves are made, each non-track groove region having a pit recording region;

wherein the recording area further includes an embossed pit pattern formed in the pit recording region and representing information about each of the recording tracks;

wherein the recording area further includes a detection pattern provided in one of the non-track groove regions and configured to permit optical detection of movement of a light spot of a reading laser beam across one of the recording tracks;

wherein the detection pattern comprises a track counting U-groove having a center that is aligned with a center of each of the track lands;

wherein each hack counting U-groove is recessed below each embossed pit pattern; and wherein a depth of the track grooves and a depth of the track counting U-groove are pre-determined, such that a same polarity to the signal is generated by applying the reading laser beam to the track grooves and the track counting U-groove.

* * * * *

UNITED STATES PATENT AND TRADEMARK OFFICE
CERTIFICATE OF CORRECTION

PATENT NO. : 6,800,348 B2
DATED : April 19, 2005
INVENTOR(S) : William M. Bishop et al.

It is certified that error appears in the above-identified patent and that said Letters Patent is hereby corrected as shown below:

<u>Column 10,</u>
Line 66, following the phrase *outer conduits,* insert -- 104 and 112 could have a nominal outside diameter of --

Signed and Sealed this

Fifth Day of July, 2005

JON W. DUDAS
*Director of the United States Patent and Trademark Office*